United States Patent
Shimada et al.

[11] Patent Number: 6,084,653
[45] Date of Patent: Jul. 4, 2000

[54] LIQUID CRYSTAL DISPLAY HAVING AN ACTIVE MATRIX SUBSTRATE WITH THERMOSETTING INTER-LAYER INSULATING FILM WITH A THICKNESS OF GREATER THAN 2 $\mu$M

[75] Inventors: Yoshinori Shimada, Yamatokoriyama; Yukinobu Nakata; Akihiro Yamamoto, both of Tenri, all of Japan

[73] Assignee: Sharp Kabushiki Kaisha, Osaka, Japan

[21] Appl. No.: 09/248,282

[22] Filed: Feb. 11, 1999

Related U.S. Application Data

[62] Division of application No. 08/821,758, Mar. 20, 1997, Pat. No. 5,907,376.

[30] Foreign Application Priority Data

Apr. 17, 1996 [JP] Japan ........................ 8-95745

[51] Int. Cl.[7] ........................ G02F 1/13; G02F 1/136
[52] U.S. Cl. ........................ 349/187; 349/42; 349/43
[58] Field of Search ........................ 349/42, 43, 187

[56] References Cited

U.S. PATENT DOCUMENTS

| | | | |
|---|---|---|---|
| 4,593,168 | 6/1986 | Amada | 219/10.55 |
| 5,055,899 | 10/1991 | Wakai et al. | 349/43 |
| 5,434,441 | 7/1995 | Inoue et al. | 257/347 |
| 5,463,481 | 10/1995 | Yamamura | 349/74 |
| 5,621,556 | 4/1997 | Fulks et al. | 349/42 |
| 5,641,974 | 6/1997 | den Boer et al. | 257/59 |
| 5,679,268 | 10/1997 | Takahashi et al. | 216/18 |
| 5,682,211 | 10/1997 | Yao et al. | 349/38 |
| 5,877,830 | 3/1999 | Shimada et al. | 349/43 |
| 5,877,832 | 3/1999 | Shimada | 349/43 |

FOREIGN PATENT DOCUMENTS

| | | |
|---|---|---|
| 60215319 | 9/1985 | Japan . |
| 01283250 | 10/1989 | Japan . |
| 02043752 | 2/1990 | Japan . |
| 5-249494 | 9/1993 | Japan . |

OTHER PUBLICATIONS

*Theory of Elasticity*, Third Edition, S.P. Timoshenko et al, Chapter 13, "Thermal Stress", pp. 431–447 (May 1979).

*Primary Examiner*—William L. Sikes
*Assistant Examiner*—Tarifur R. Chowdhury
*Attorney, Agent, or Firm*—Nixon & Vanderhye P.C.

[57] ABSTRACT

In the fabrication of an active matrix substrate, when forming a contact hole in an inter-layer insulating film made of a thermosetting resin and hardening the inter-layer insulating film by heat, the temperature gradient in raising the temperature from room temperature to a baking temperature is arranged to be larger than 10° C./minute. As a result, the tilt angle of the slant face of the contact hole is controlled to be within a range of 45° to 60°.

12 Claims, 8 Drawing Sheets

LIQUID CRYSTAL DISPLAY HAVING AN ACTIVE MATRIX SUBSTRATE WITH THERMOSETTING INTER-LAYER INSULATING FILM WITH A THICKNESS OF GREATER THAN 2 μM

This application is a division of application Ser. No. 08/821,758, filed Mar. 20, 1997, now U.S. Pat. No. 5,907,376, issued May 25, 1999.

FIELD OF THE INVENTION

The present invention relates to an active matrix substrate fabricated by arranging thin film transistors as switching elements in a matrix pattern, the fabrication process thereof, and a liquid crystal display device constructed by such an active matrix substrate for use as a display of, for example, a computer and a television system.

BACKGROUND OF THE INVENTION

A conventional active matrix substrate used for a wiring substrate of a liquid crystal display device, includes thin film transistors (TFTs) as switching elements. FIG. 7 is a circuit diagram showing the structure of the conventional active matrix substrate. This conventional active matrix substrate includes gate signal lines 24 and source signal lines 26 arranged to intersect at right angles on a surface of a transparent insulating substrate, and TFTs 23 and picture element capacitors 22 corresponding to the respective intersections of these signal lines. The gate signal line 24 is connected to the gate electrode of the TFT 23, and the TFT 23 corresponding to a picture element is driven by a scanning signal input to the gate electrode from the gate signal line 24.

The source signal line 26 is connected to the source electrode of the TFT 23 to allow an input of a data signal to the source electrode. A picture element electrode and one of the terminals of the picture element capacitor 22 are connected to the drain electrode of the TFT 23. The other terminal of the picture element capacitor 22 is connected to a picture element capacitor wire 25. The picture element capacitor wire 25 is connected to a common electrode (not shown) mounted on a facing substrate in the case of a liquid crystal display device.

FIG. 8 illustrates the planar structure of the above-mentioned conventional active matrix substrate, and FIGS. 9 and 10 show the cross sectional structure thereof. As illustrated in FIG. 9, this active matrix substrate is constructed by layering a gate electrode 32, a gate insulating film 33, a semiconductor layer 34, a channel protecting layer 35, an n$^+$ amorphous silicon layer 36 functioning as a source and a drain, an ITO film 37 functioning as source and drain electrodes, a metal film layer 38 as a source signal line, an inter-layer insulating film 39, and a transparent conductive layer as a pixel electrode 41 in this order on a transparent insulating substrate 31.

As shown in FIGS. 8 and 10, the pixel electrode 41 is connected to the ITO film 37 as the drain electrode of the TFT through a contact hole 40 formed in the inter-layer insulating film 39. As a material of the inter-layer insulating film 39, for example, a photosensitive acrylic resin is used. The inter-layer insulating film 39 having the contact hole 40 is formed by applying the photosensitive acrylic resin, and subjecting the acrylic resin to the exposure, alkali development, and hardening by heat.

In this structure, since the inter-layer insulating film 39 is formed between the pixel electrode 41 and the gate and source signal lines, it is possible to overlap the pixel electrode 41 and these signal lines. Overlapping the pixel electrode 41 and these signal lines enables shielding of an electric field caused by the signal lines, thereby preventing alignment defects of liquid crystals.

A liquid crystal cell can be fabricated by further forming an alignment film 46 on the pixel electrode 41 of the above-mentioned active matrix substrate, fastening the active matrix substrate and a facing substrate fabricated by forming a black matrix 43, a color filter 44, a common electrode 45 and the alignment film 46 in this order on a surface of a transparent insulating substrate 42, and introducing liquid crystals 47 between these substrates.

Japanese Publication for Unexamined Patent Application (Tokukaihei) No. 5-249494 (1993) discloses a technique for preventing a lowering of the display contrast due to leakage of light by restraining a reverse tilt domain by forming the contact hole 40 so that the tilt angle α (see FIG. 10) of the slant face of the contact hole 40 is not greater than 60°. It is also disclosed in this publication that the leakage of light is more effectively prevented by arranging the tilt angle a of the slant face of the contact hole 40 not to be greater than 45°.

It is recited in the publication (Tokukaihei) No. 5-249494 (1993) above that the depth of the contact hole 40, i.e., the thickness of the inter-layer insulating film 39, is preferably not more than 2 μm, and more preferably not more than 1 μm in order to produce sufficient effects by the formation of the contact hole 40 with a slant face whose tilt angle is not greater than 60°.

However, the pixel electrode 41 produces a parasitic capacitance with the source signal line (metal film layer 38), gate electrode 32 and gate signal line through the inter-layer insulating film 39. Since the parasitic capacitance is in inverse proportion to the thickness of the inter-layer insulating film 39, the parasitic capacitance increases as the thickness becomes smaller. An increase in the parasitic capacitance causes a vicious effect on the display quality of the liquid crystal cell.

On the other hand, when the thickness of the inter-layer insulating film 39 is increased to decrease the parasitic capacitance, if the slant face of the contact hole 40 is tilted at an angle not greater than 45°, the area of the opening of the contact hole 40 becomes larger. As a result, the occurrence of leakage of light would increase. Alternatively, the need of forming a wider auxiliary capacitance signal line 49 arises to block the leakage of light. The increase in the width of the auxiliary capacitance signal line 49 causes a lowering of the aperture ratio of the liquid crystal cell.

Considering the above-mentioned problems, it is a main object of the present invention to find a tilt angle of the contact hole which gives suitable results with regard to the aperture ratio of the liquid crystal cell and the display quality, and to provide a fabrication process which achieves such a suitable tilt angle.

SUMMARY OF THE INVENTION

An active matrix substrate of the present invention including: switching elements arranged in a matrix pattern; gate signal lines for supplying scanning signals to the switching elements and source signal lines for supplying data signals to the switching elements, the gate signal lines and the source signal lines intersecting at right angles; an inter-layer insulating film formed in a layer above the switching elements, gate signal lines and source signal lines; a contact hole made through the inter-layer insulating film; and a pixel electrode formed on the inter-layer insulating film, the pixel electrode being connected to a drain electrode through the contact hole, is characterized in that the contact hole has a slant face whose tilt angle is between 45° and 60° both inclusive in order to solve the above-mentioned problems.

When forming a liquid crystal display device using the active matrix substrate, it is necessary to shield the contact hole of the active matrix substrate from leaked light due to disorderly alignment of liquid crystals caused by the slant face of the contact hole. If the tilt angle of the slant face of the contact hole is arranged not to be smaller than 45°, it is possible to decrease the ratio of increase in the area of the opening of the contact hole on the pixel electrode side to the area of the bottom part of the contact hole, thereby reducing the area of a portion required to be shielded from light.

Moreover, if the tilt angle is not greater than 60°, sufficient coverage is given for the contact hole when forming the pixel electrode, thereby preventing contact defects between the drain electrode and the pixel electrode.

Thus, by arranging the tilt angle of the slant face of the contact hole to be in a range of 45° to 60°, it is possible to provide an active matrix substrate capable of achieving a liquid crystal display device having a high aperture ratio and no display deficiency due to contact defects. In addition, since the production yield is improved, the cost can be lowered. The liquid crystal display device is obtained by sandwiching liquid crystals between the active matrix substrate and the facing substrate.

In order to solve the above-mentioned problems, a first process for fabricating an active matrix substrate according to the present invention includes: (a) forming switching elements, gate signal lines and source signal lines on a substrate; (b) forming a resin film having at least a thermosetting property in a layer above the switching elements, gate signal lines and source signal lines, and making a contact hole in the resin film by patterning; and (c) hardening the resin film by raising the temperature from room temperature to a baking temperature at such a temperature gradient that a rise in temperature per minute is not larger than 10° C.

In this process, when hardening the resin film having the contact hole therein by heat, since the temperature is raised from room temperature to the baking temperature at such a temperature gradient that a rise in temperature per minute is not larger than 10° C., it is possible to prevent the deformation of the resin film due to heat and easily control the tilt angle of the slant face of the contact hole. It is thus possible to prevent an increase in the area of the opening of the contact hole. Consequently, a contact hole having an opening with a small area can be formed in the active matrix substrate. When such an active matrix substrate is used for the fabrication of a liquid crystal display device, the aperture ratio of the liquid crystal display device can be improved.

The liquid crystal display device is constructed by sandwiching liquid crystals between an active matrix substrate fabricated in the above-mentioned process and a facing substrate including at least a common electrode.

In order to solve the above-mentioned problems, a second process for fabricating an active matrix substrate according to the present invention includes: (a) forming switching elements, gate signal lines and source signal lines on a substrate; (b) forming a resin film having at least a thermosetting property in a layer above the switching elements, gate signal lines and source signal lines, and making a contact hole in the resin film by patterning; (c) pre-baking the resin film; and (d) hardening the resin film by post-baking.

In this process, since pre-baking is performed, the deformation of the resin film due to heat during post-baking is prevented. It is thus possible to easily control the tilt angle of the slant face of the contact hole. Moreover, the prevention of the deformation of the resin film by pre-baking allows an increase in the rate of raising the temperature to a post-baking temperature, thereby improving the production efficiency. Consequently, an active matrix substrate can be provided at low price. A liquid crystal display device is constructed by sandwiching liquid crystals between an active matrix substrate fabricated in the above-mentioned process and a facing substrate including at least a common electrode.

For a fuller understanding of the nature and advantages of the invention, reference should be made to the ensuing detailed description taken in conjunction with the accompanying drawings.

DESCRIPTION OF THE PREFERRED EMBODIMENTS

The following description will discuss one embodiment of the present invention with reference to FIGS. 1 to 5.

Figure 1:
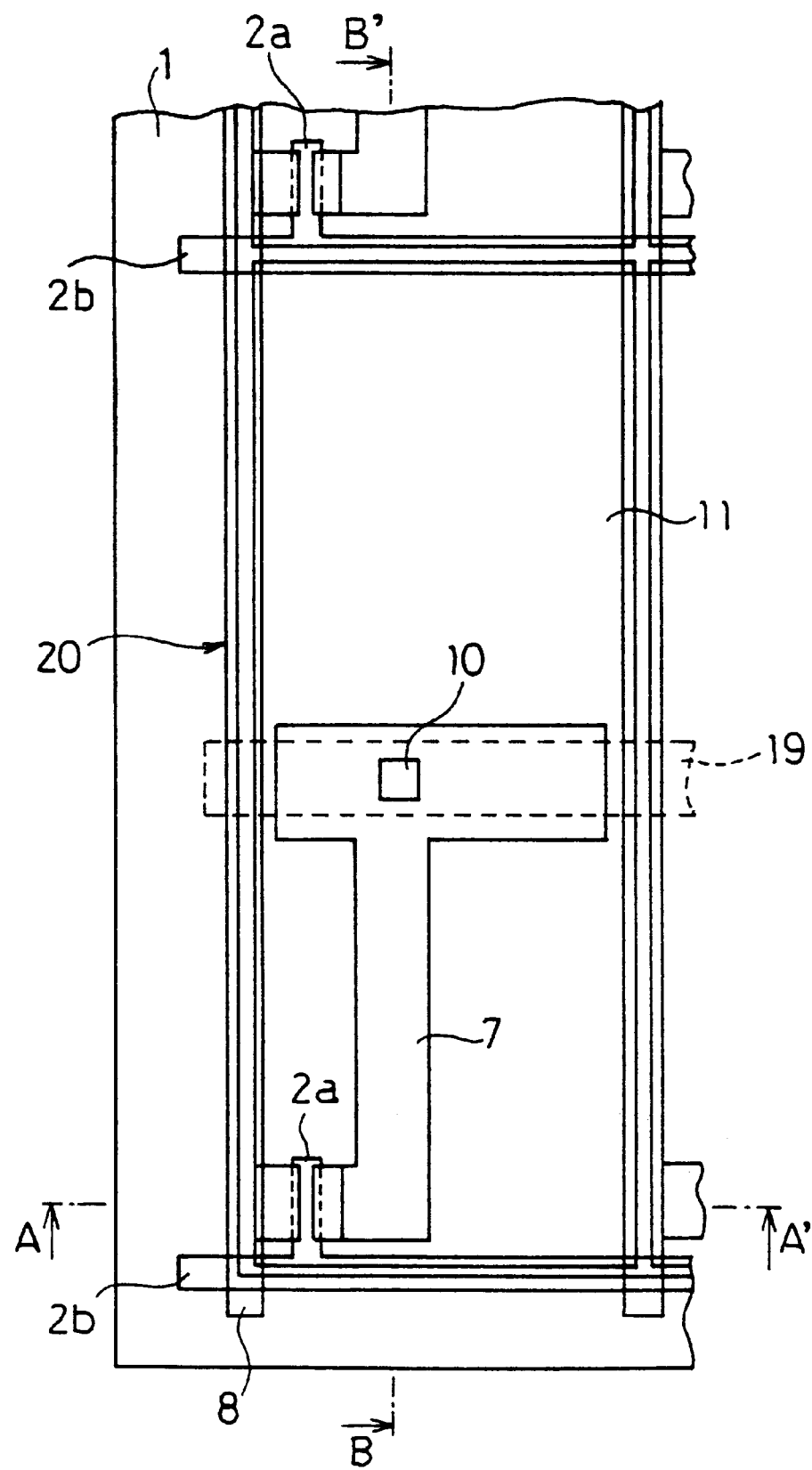
FIG. 1 is a plane view showing a schematic structure of an active matrix type liquid crystal cell according to one embodiment of the present invention.

First, with reference to FIGS. 1 and 2, an active matrix substrate of this embodiment and a schematic structure of a liquid crystal cell (a liquid crystal display device) using this substrate will be explained together with a fabrication process thereof. As illustrated in FIG. 1, the active matrix substrate is fabricated by forming gate signal lines 2*b* parallel to each other and an auxiliary capacitance signal line 19 having light blocking properties on a transparent insulating substrate 1. A gate electrode 2*a* of a thin film transistor (TFT) as a switching element is formed at the same time the gate signal line 2*b* is formed.

Figure 2:
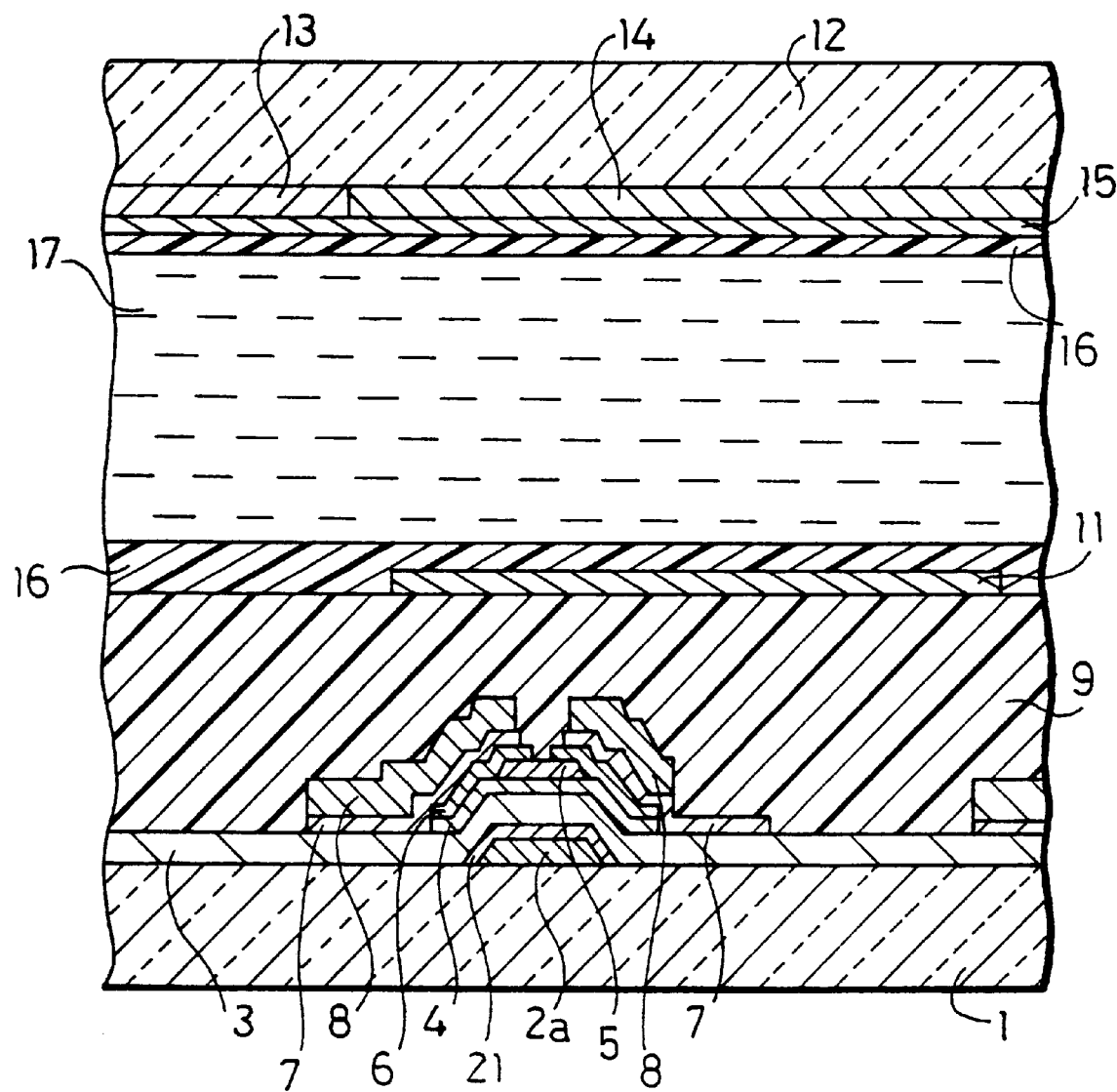
FIG. 2 is a cross sectional view of the liquid crystal cell cut across the A–A' line shown in FIG. 1.

As shown in FIG. 2, the TFT is constructed by layering a gate oxide film 21, a gate insulating film 3, a semiconductor layer 4, a channel protecting layer 5, an n⁺ amorphous silicon layer 6 functioning as source and drain electrodes in this order on the gate electrode 2a on the insulating substrate 1 in a known manner.

Furthermore, by forming an ITO film 7 and a metal layer 8 in sequence on the n⁺ amorphous silicon layer 6 by sputtering, a source signal line 20 intersecting the gate signal lines 2b at right angles is formed. As shown in FIG. 1, the ITO film 7 on the drain electrode side is extended to be connected to a pixel electrode 11 through a contact hole 10, to be described later.

In this embodiment, as described above, the source signal line 20 has a double-layer structure of the metal layer 8 and the ITO film 7. In this structure, even when part of the metal film 8 has a defect, the electric connection is retained by the ITO film 7, thereby effectively preventing a disconnection of the source signal line 20.

Figure 3:
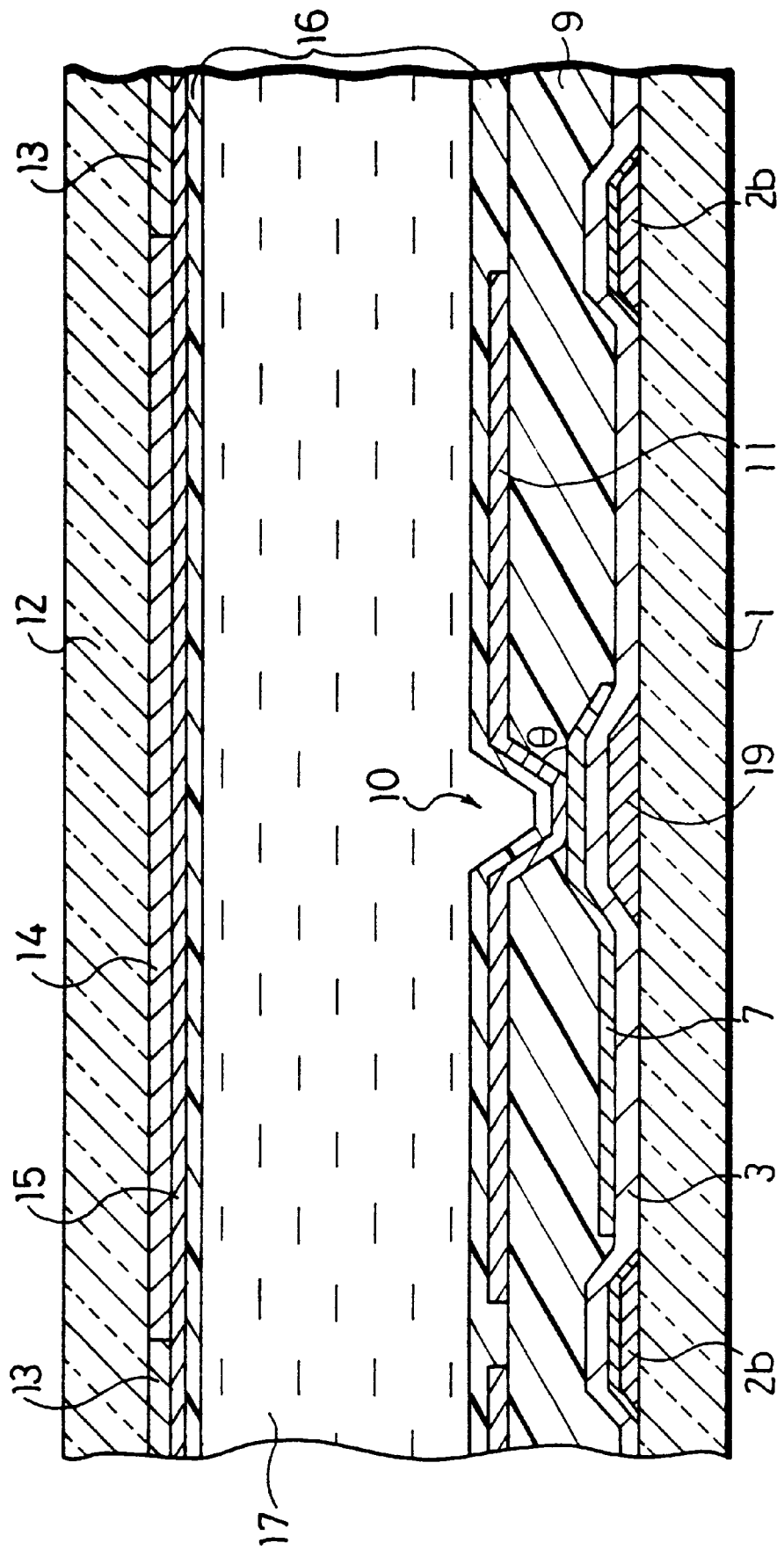
FIG. 3 is a cross sectional view of the liquid crystal cell cut across the B–B' line shown in FIG. 1.

Moreover, an inter-layer insulating film 9 having the contact hole 10 reaching the ITO film 7 is formed as shown in FIG. 3 by applying an acrylic resin diluted with a solvent, such as diethylene glycol ethyl methyl ether, in a thickness of 3 μm, performing exposure, alkali development and then baking to harden the acrylic resin by heat.

As a material for the inter-layer insulating film 9, materials having photosensitive properties are preferred. When a photosensitive material is used, the patterning step is executed only by exposure, thereby simplifying the processing steps.

The requirements for the auxiliary capacitance signal line 19 formed on the insulating substrate 1 beforehand are that the auxiliary capacitance signal line 19 is formed by a material with light blocking properties, and has a width capable of completely covering the opening of the contact hole 10. By satisfying the requirements, it is possible to produce a liquid crystal cell which blocks leaked light due to disorderly alignments of liquid crystals in the contact hole 10 and achieves a high contrast.

Subsequently, a transparent conductive film is formed on the inter-layer insulating film 9 by sputtering, and subjected to patterning so as to form the pixel electrode 11. At the bottom of the contact hole 10, the pixel electrode 11 is connected to the ITO film 7 exposed through the contact hole 10. The above-mentioned processing steps enable the fabrication of an active matrix substrate having thereon TFTs as switching elements, arranged in a matrix pattern, and the gate signal lines 2b for supplying scanning signals to the TFTs and the source signal lines 20 for supplying data signals to the TFTs, arranged to intersect at right angles.

On the other hand, for the fabrication of a facing substrate facing the active matrix substrate, first, a metal film is deposited on a transparent insulating substrate 12 by sputtering and subjected to patterning to form a light blocking plate 13. Next, a red-green-blue color filter 14 is formed by applying, exposing and developing a color photoresist. Further, a transparent conductive film like ITO is deposited by sputtering, and subjected to patterning to form a common electrode 15. The common electrode 15 is connected to the auxiliary capacitance signal line 19 on the active matrix substrate. The facing substrate is thus obtained through the above-mentioned processing steps.

Thereafter, a liquid crystal cell is fabricated by forming an alignment film 16 on both of the active matrix substrate and the facing substrate, fastening these substrates together, and introducing liquid crystals 17 in a space between the substrates.

Figure 4:
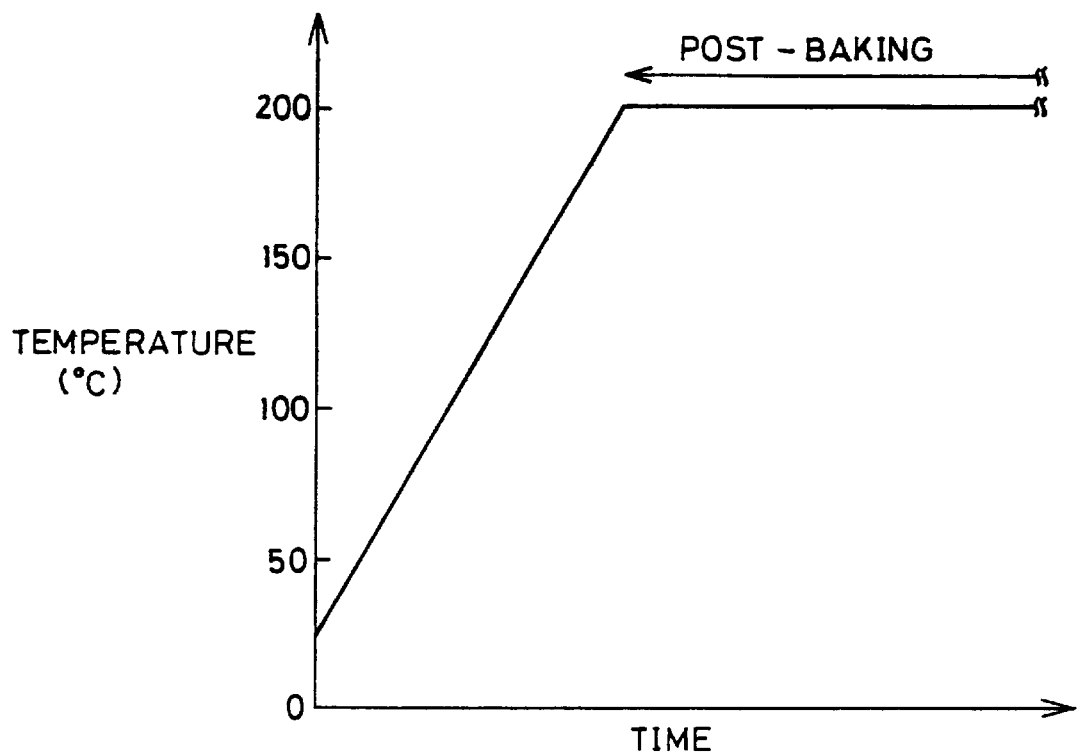
FIG. 4 is a graph showing a change in substrate temperature in the step of hardening an inter-layer insulating film having a contact hole by heat in the fabrication of the liquid crystal cell.

FIG. 4 is a graph showing a change in substrate temperature in the step of hardening the inter-layer insulating film 9 by heat. In this embodiment, as shown in FIG. 4, heating is performed so that the substrate temperature is raised at a certain temperature gradient until the substrate temperature has increased to a post-baking temperature from room temperature, and a uniform post-baking temperature is kept during post-baking.

Table 1 presented below shows the relationship between the temperature gradient in raising the substrate temperature from room temperature to the post-baking temperature and the tilt angle θ of a slant face of the contact hole 10. The thickness of the inner-layer insulating film 9 was made 3 μm, and a dimension a, in a gate direction, of the bottom of the contact hole 10, i.e., of a contact face between the pixel electrode 11 and the ITO film 7 (see FIG. 5), was arranged to be 5 μm, without changing the conditions other than the temperature gradient.

TABLE 1

| Temperature gradient [° C./minute] | Tilt angle θ [degree] | b/a |
|---|---|---|
| 5 | 55 | 2.3 |
| 10 | 45 | 2.8 |
| 15 | 35 | 3.6 |

Figure 5:
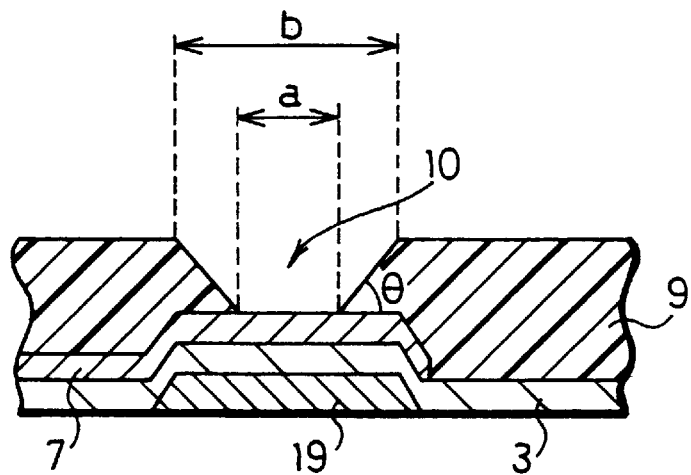
FIG. 5 is a cross sectional view showing the shape of the contact hole formed in the inter-layer insulating film of an active matrix substrate constituting the liquid crystal cell.

As is clear from Table 1, the tilt angle θ of the slant face of the contact hole 10 becomes smaller with an increase in the temperature gradient. Additionally, if the width of the opening of the contact hole 10 is represented by b as shown in FIG. 5, the measured values b/a given in Table 1 differ from the values calculated based on the tilt angle θ and the thickness of the inter-layer insulating film 9. The reason for such differences is that when the temperature gradient in the hardening step by heat is large, the acrylic resin deforms due to heat around the opening of the contact hole 10, and causes an increase in the area of the opening. It was confirmed that the phenomenon of deformation of the acrylic resin becomes worsen with an increase in the temperature gradient. It was also confirmed that the increase in the area of the opening due to the deformation of the acrylic resin becomes noticeable with an increase in the thickness of the inter-layer insulating film 9.

Since leakage of light occurs due to disorderly alignment of the liquid crystals 17, the opening of the contact hole 10 must be completely shielded from light by the auxiliary capacitance signal line 19 in order to achieve a good contrast. Therefore, if the tilt angle θ of the contact hole 10 is too small, the area of the opening of the contact hole 10 increases. As a result, the necessity of increasing the width of the auxiliary capacitance signal line 19 arises, and thus a liquid crystal cell with a high aperture ratio cannot be achieved.

In order to achieve a sufficient aperture ratio for a liquid crystal cell, it is preferred to arrange the tilt angle θ of the slant face of the contact hole 10 not to be smaller than 45°. However, if the tilt angle θ of the slant face of the contact hole 10 is greater than 60°, it is difficult to ensure sufficient coverage for the bottom part of the contact hole 10 when forming the pixel electrode 11 by depositing a film like an ITO film on the surface of the inter-layer insulating film 9. As a result, the occurrence of contact defect between the pixel electrode 11 and the ITO film 7 increases.

Hence, an appropriate range for the tilt angle θ of the slant face of the contact hole 10 is approximately between 45° and 60°. When the tilt angle θ is within the appropriate range, the width of the auxiliary capacitance signal line 19 for shielding the opening of the contact hole 10 from light can be made thinner than that of a conventional structure, thereby improving the aperture ratio. Additionally, it is possible to certainly ensure a connection between the ITO film 7 and the pixel electrode 11 at the bottom of the contact hole 10 As is clear from Table 1, by arranging the temperature gradient from room temperature to the post-baking temperature not to be larger 10° C./minute in the hardening step by heat, it is possible to provide the contact hole 10 with a slant face whose tilt angle θ is within the above-mentioned appropriate range.

For example, as shown in Table 1, when the hardening step by heat is executed at a temperature gradient of 15° C./minute, the tile angle of the slant face of a resultant contact hole is 35°, showing a great deviation from the appropriate range. Namely, when the temperature is abruptly raised to the post-baking temperature, the tilt angle cannot be appropriately controlled. It is considered that such a great deviation from the appropriate range when the temperature gradient is larger than 10° C./minute is related not only to the characteristics of the acrylic resin, but also to the volatile rate of the solvent used for diluting the acrylic resin. In general, the volatile rate of the solvent depends on the temperature gradient, and becomes higher with an increase in the temperature gradient. A high volatile rate tends to cause the acrylic resin to deform due to heat. Therefore, the temperature gradient is preferably not larger than 10° C./minute.

It is preferred to arrange the thickness of the inter-layer insulating film 9 not to be less than 2 μm for the reason below. The inter-layer insulating film 9 produces a parasitic capacitance between the pixel electrode 11 and the source signal line 20 and gate signal line 2b. The value of the parasitic capacitance is in inverse proportion to the thickness of the inter-layer insulating film 9. It is known that crosstalk occurs when the parasitic capacitance is large, and the crosstalk causes vicious effects on the display quality of the liquid crystal cell. When the thickness of the inter-layer insulating film 9 is arranged not to be less than 2 μm, it is possible to reduce the parasitic capacitance to such a value that does not cause vicious effects on the display quality of the liquid crystal cell.

Furthermore, as described above, even when the thickness of the inter-layer insulating film 9 is made relatively thick, i.e., equal to or more than 2 μm, by arranging the temperature gradient in the hardening step by heat not to be larger than 10° C./minute, it is possible to prevent the area of the opening of the contact hole 10 from being increased by the deformation of the acrylic resin due to heat. As a result, the area of the opening of the contact hole 10 and the area of the light blocking section are decreased, and an improved aperture ratio of the liquid crystal cell is achieved as well as a reduced parasitic capacitance and good display quality.

In this embodiment, the acrylic resin is used as a material for the inter-layer insulating film 9. However, it is possible to use other materials. In general, the phenomenon of the deformation of resin due to heat can be minimized by arranging the temperature rise per minute not to be more than about one fifteenth of the baking temperature in the step of raising temperature from room temperature to the baking temperature.

Moreover, in the above-mentioned active matrix substrate, the contact hole 10 is shielded from light by the auxiliary capacitance signal line 19. Therefore, an improved aperture ratio is achieved compared to a case in which a black matrix for shielding the contact hole 10 from light is separately provided. Furthermore, since the area of the opening of the contact hole 10 is made small by arranging the tilt angle of the slant face of the contact hole 10 to be between 45° and 60°, it is possible to make the width of the auxiliary capacitance signal line 19 less than that of a conventional structure. As a result, the area of the light blocking section is reduced, and the aperture ratio is further improved. It is thus possible to provide an active matrix substrate capable of achieving a liquid crystal display device with a high aperture ratio.

EMBODIMENT 2

Figure 6:
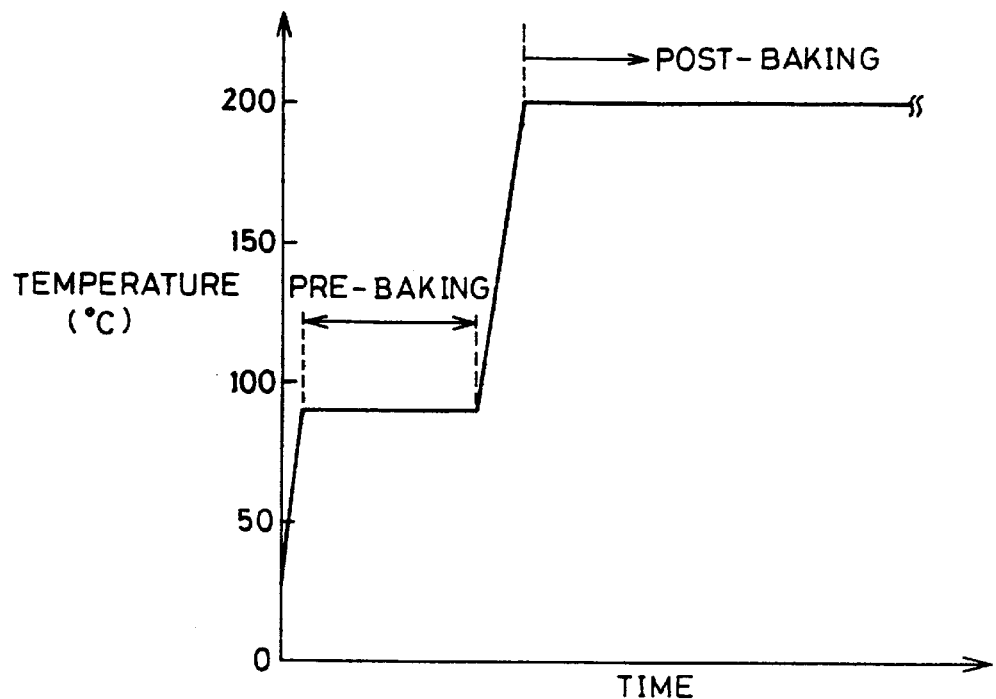
FIG. 6 is a graph showing a change in substrate temperature in the step of hardening an inter-layer insulating film having a contact hole by heat in the fabrication of a liquid crystal cell according to another embodiment of the present invention.
Figure 7:
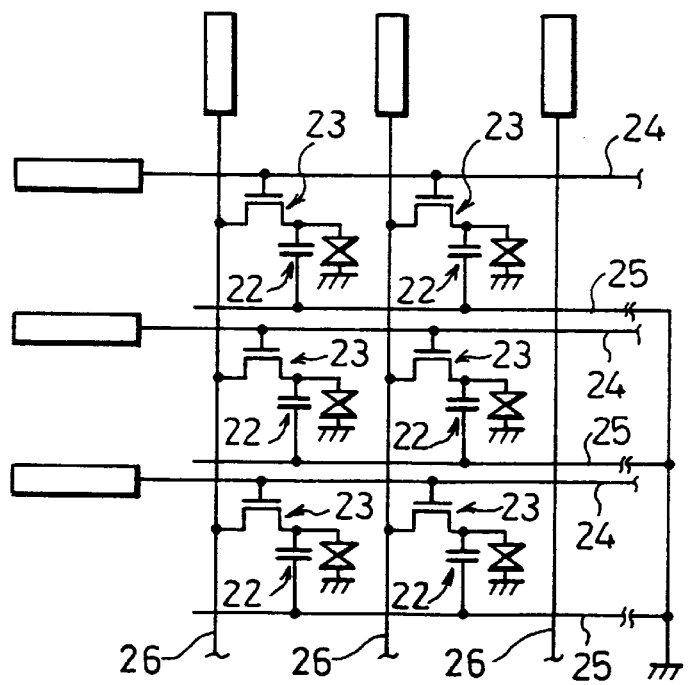
FIG. 7 is a circuit diagram showing the structure of a conventional active matrix substrate.
Figure 8:
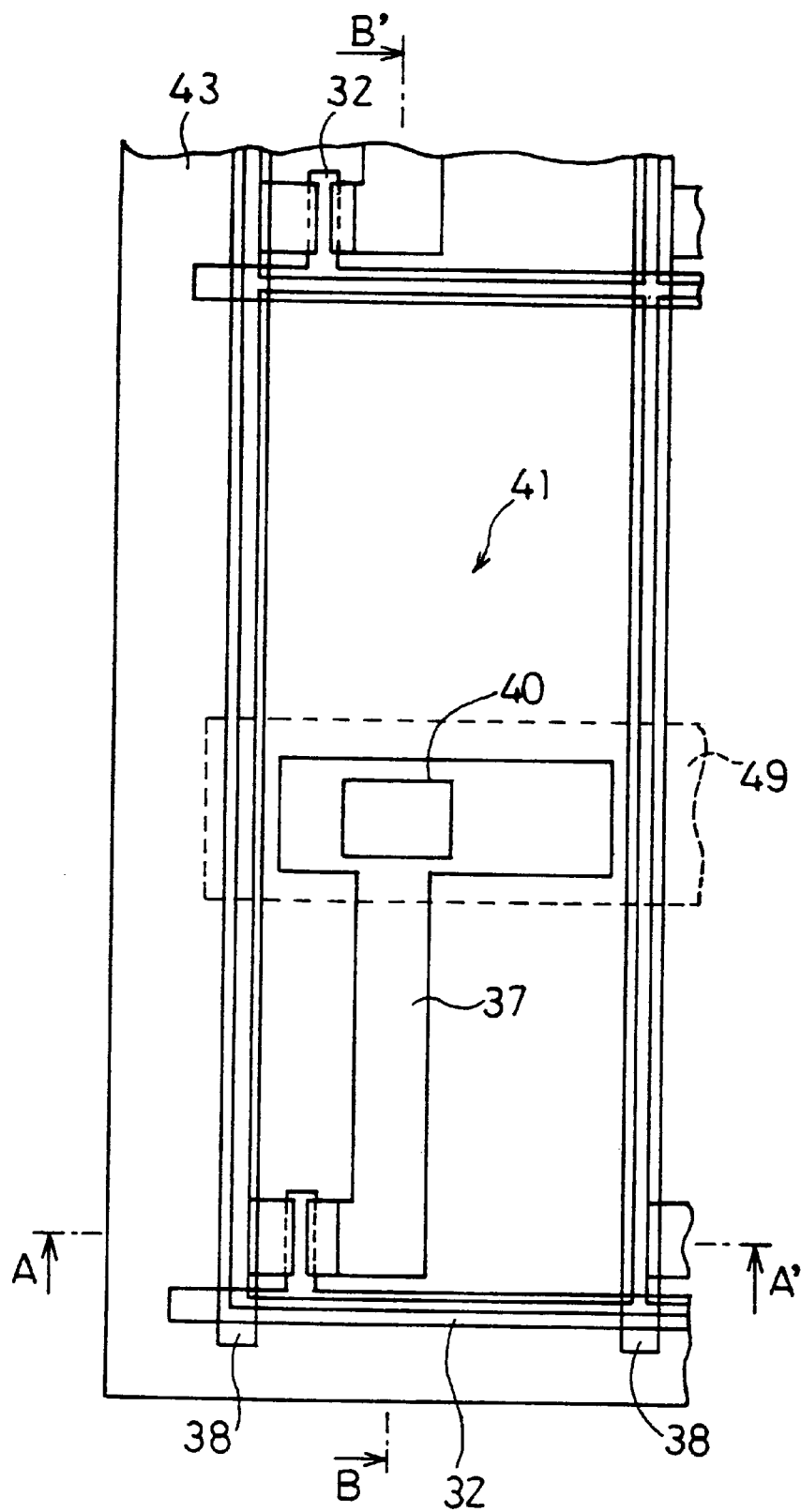
FIG. 8 is a plane view showing a schematic structure of a conventional active matrix type liquid crystal cell.
Figure 9:
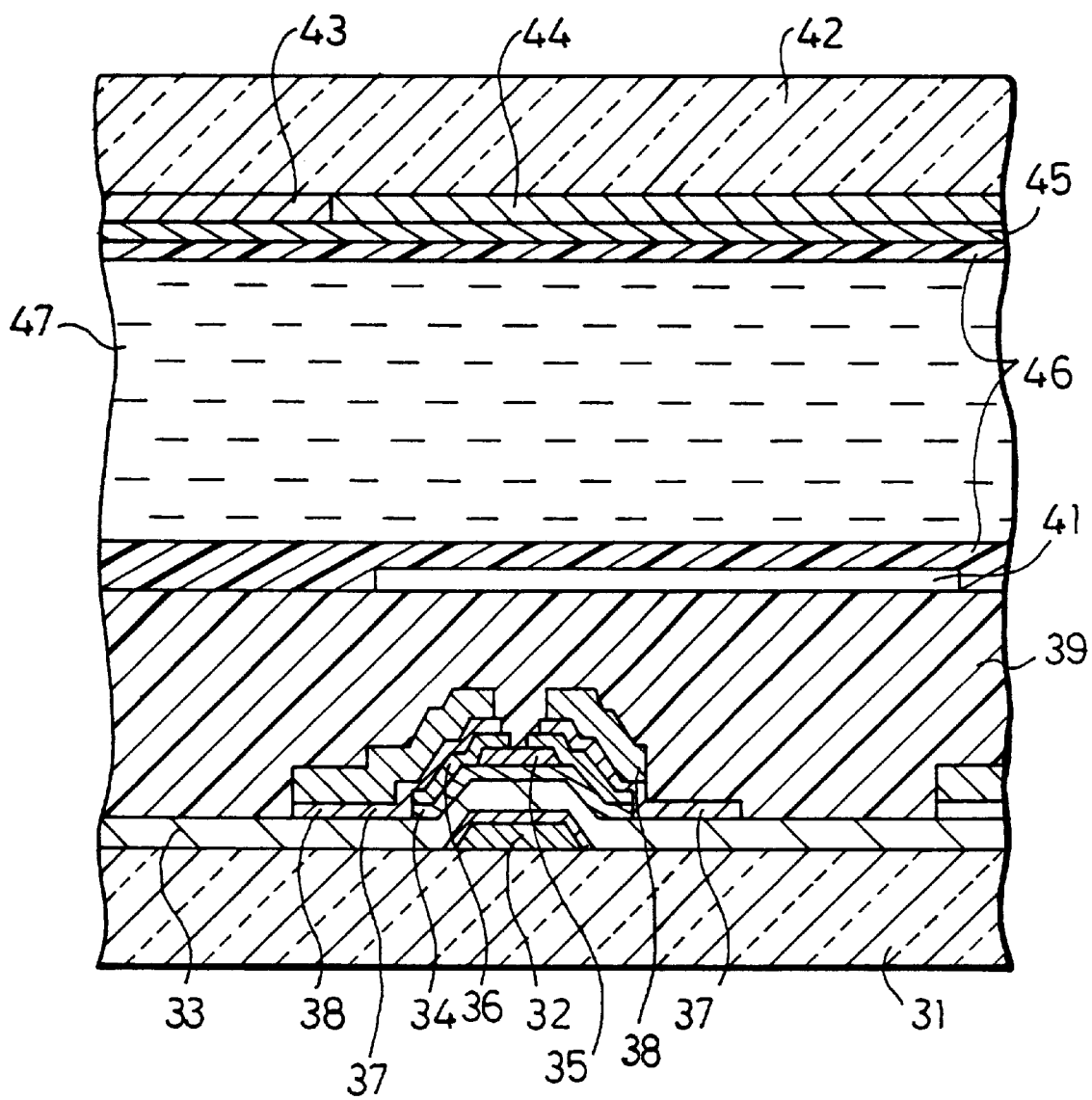
FIG. 9 is a cross sectional view of the liquid crystal cell cut across the A–A' line shown in FIG. 8.
Figure 10:
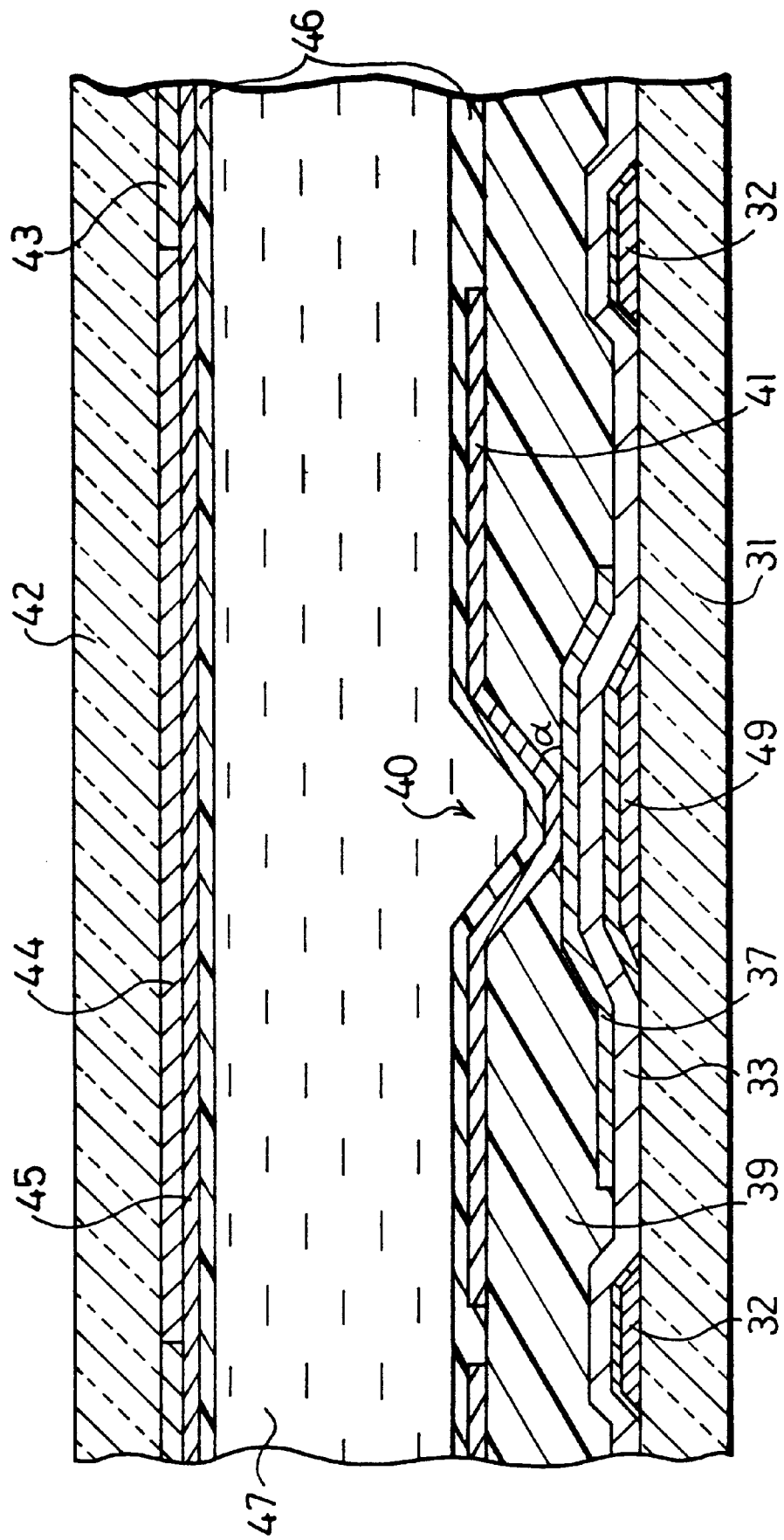
FIG. 10 is a cross sectional view of the liquid crystal cell cut across the B–B' line shown in FIG. 8.

The following description will discuss another embodiment of the present invention with reference to FIG. 6. The members having the same structure as in Embodiment 1 will be designated by the same code and their description will be omitted.

In this embodiment, in the step of hardening the acrylic resin diluted with the solvent by heat to form the inter-layer insulating film 9 having the contact hole 10, pre-baking was performed at 90° C. for five minutes in the course of raising the substrate temperature from room temperature to a post-baking temperature, and then the substrate temperature was again raised to the post-baking temperature (200° C.). As a result, similarly to Embodiment 1, the tilt angle of the slant face of the contact hole 10 was made within the appropriate range of approximately 45° to 60°.

The pre-baking can reduce the occurrence of the deformation of acrylic resin due to heat, and increase the rate of raising the temperature. Consequently, the production efficiency is improved, and the production cost is lowered.

Table 2 below shows the relationship between the pre-baking temperature and the tilt angle θ of the slant face of the contact hole 10 formed in the inter-layer insulating film 9. In this embodiment, like Embodiment 1 a photosensitive acrylic resin diluted with a solvent (diethylene glycol ethyl methyl ether) was used as a material for the inter-layer insulating film 9.

TABLE 2

| Pre-baking temp. [° C.] | Tilt angle θ [degree] |
| --- | --- |
| 90 | 50 |
| 95 | 45 |
| 100 | 35 |

As is clear from Table 2, the higher the pre-baking temperature, the smaller the tile angle θ. It was also confirmed that the degree of the change of the tilt angle θ becomes greater with an increase in the pre-baking temperature.

By pre-baking the acrylic resin at 90° for at least five minutes, preferably six to ten minutes, even if the rate of raising temperature is increased, it is possible to arrange the tilt angle θ of the slant face of the contact hole 10 to be within the above-mentioned appropriate range.

Alternatively, by pre-backing the acrylic resin at 90° for two minutes and 20 seconds, further pre-baking the acrylic resin at 100° for two minutes and 20 seconds, and then raising the temperature to post-bake the acrylic resin, the same effect can be produced.

The above-mentioned embodiments are not presented for the purpose of limiting the invention, and may therefore be varied within the scope of the invention. For example, in the above-mentioned embodiments, the photosensitive acrylic resin diluted with diethylene glycol ethyl methyl ether was used as a material for the inter-layer insulating film 9. However, it is possible to use a resin having light transmitting properties and insulating properties, more preferably, photosensitive properties, for example, benzocyclobutene.

Moreover, in the above-mentioned structure, the contact hole 10 is formed in a position where the contact hole 10 is shielded from light by the auxiliary capacitance signal line 19. However, the location of the contact hole 10 is not restricted to this position. For instance, the contact hole 10 may be formed to overlap the gate signal line 2b so that the gate signal line 2b completely shields the opening of the contact hole 10 from light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for fabricating an active matrix substrate comprising the steps of:

forming switching elements, gate signal lines and source signal lines on a substrate;

forming a resin film having at least a thermosetting property in a layer above said switching elements, gate signal lines and source signal lines, and making a contact hole in said resin film by patterning; and hardening said resin film by raising a temperature from room temperature to a baking temperature at such a temperature gradient that a rise in temperature per minute is not larger than 10° C.

2. An active matrix substrate fabricated by the process as set forth in claim 1.

3. A liquid crystal display device comprising:

an active matrix substrate fabricated by the process as set forth in claim 1;

a facing substrate having at least a common electrode; and liquid crystals sandwiched between said active matrix substrate and said facing substrate.

4. A process for fabricating an active matrix substrate comprising the steps of:

(a) forming switching elements, gate signal lines and source signal lines on a substrate;

(b) forming a resin film having at least a thermosetting property in a layer above said switching elements, gate signal lines and source signal lines;

(c) making a contact hole in said resin film by patterning;

(d) after step (c), pre-baking said resin film in which the contact hole has been formed; and (e) hardening said resin film by post-baking such that the resin film becomes a permanent layer in the active matrix substrate.

5. An active matrix substrate fabricated by the process as set forth in claim 4.

6. A liquid crystal display device comprising:

an active matrix substrate fabricated by the process as set forth in claim 4;

a facing substrate having at least a common electrode; and liquid crystals sandwiched between said active matrix substrate and said facing substrate.

7. The process for fabricating an active matrix substrate as set forth in claim 4, wherein in step (b) the resin is an acrylic resin, the pre-baking step (d) is performed at 90° C., and the post-baking step (e) is performed at 200° C.

8. The process for fabricating an active matrix substrate as set forth in claim 7, wherein the pre-baking step (d) is performed for 5 minutes or more.

9. The process for fabricating an active matrix substrate as set forth in claim 4, wherein the step (d) of pre-baking includes a first pre-baking step of baking said resin film at a first temperature, and a second pre-baking step of baking said resin film at a third temperature which is higher than said first temperature but is lower than said second temperature of the post-baking step (e).

10. The process for fabricating an active matrix substrate as set forth in claim 9, wherein the first temperature is 90° C., the second temperature is 200° C., and the third temperature is 100° C.

11. The process for fabricating an active matrix substrate as set forth in claim 4, wherein a pre-baking temperature and a post-baking temperature are set such that a tilt angle of a slant face of the contact hole is in a range of 45° to 60°.

12. A process for fabricating an active matrix substrate, comprising the steps of:

(a) forming switching elements, gate signal lines, and source signal lines on a substrate;

(b) forming a resin film having at least a thermosetting property in a layer above said switching elements, gate signal lines and source signal lines, and patterning a contact hole in said resin film; and (c) hardening said resin film by raising a temperature from room temperature to a baking temperature at a temperature gradient that a rise in temperature per minute is not larger than about $\frac{1}{15}$ of the baking temperature such that the resin film becomes a permanent layer in the active matrix substrate.

* * * * *